United States Patent
Polzer

(10) Patent No.: US 9,383,731 B2
(45) Date of Patent: Jul. 5, 2016

(54) METHOD AND AUTOMATION SYSTEM FOR REPLACING AN EXISTING CONTROL DEVICE IN AN AUTOMATION SYSTEM WITH A NEW CONTROL DEVICE AND AUTOMATION SYSTEM DESIGNED FOR THIS PURPOSE

(75) Inventor: Kurt Polzer, Mössingen (DE)

(73) Assignee: Siemens Aktiengesellschaft, Munich (DE)

( * ) Notice: Subject to any disclaimer, the term of this patent is extended or adjusted under 35 U.S.C. 154(b) by 716 days.

(21) Appl. No.: 13/583,891

(22) PCT Filed: Mar. 10, 2011

(86) PCT No.: PCT/EP2011/053654
§ 371 (c)(1),
(2), (4) Date: Dec. 17, 2012

(87) PCT Pub. No.: WO2011/110649
PCT Pub. Date: Sep. 15, 2011

(65) Prior Publication Data
US 2013/0218306 A1    Aug. 22, 2013

(30) Foreign Application Priority Data
Mar. 10, 2010  (DE) .......................... 10 2010 010 890

(51) Int. Cl.
*G05B 11/01* (2006.01)
*G05B 19/042* (2006.01)
(Continued)

(52) U.S. Cl.
CPC ............ *G05B 11/01* (2013.01); *G05B 19/0428* (2013.01); *G05B 19/058* (2013.01);
(Continued)

(58) Field of Classification Search
CPC ............... G05B 11/00; G05B 19/0428; G05B 19/41845; G05B 19/058; G05B 2219/31251; G05B 2219/25471; G05B 11/01; Y02P 90/16; Y02P 90/18
USPC ............ 700/19, 21, 79; 340/3.1, 6.1; 714/4.2, 714/25, 37, E11.08, E11.081
See application file for complete search history.

(56) References Cited

U.S. PATENT DOCUMENTS

| 4,521,871 A * | 6/1985 | Galdun et al. ................. 714/11 |
| 4,819,149 A | 4/1989 | Sanik et al. |

(Continued)

FOREIGN PATENT DOCUMENTS

| CN | 1148620 C | 5/2004 |
| CN | 1620026 A | 5/2005 |

(Continued)

*Primary Examiner* — Robert Fennema
*Assistant Examiner* — Jennifer L Norton
(74) *Attorney, Agent, or Firm* — Cozen O'Connor

(57) ABSTRACT

In an automation system, a control device processes measured values received from automation components and generates control values for the, or for individual, automation components and/or other automation components. In order to shorten down times when replacing an existing control device, the new control device is tested during operation of the existing control device, for which purpose the measured values and control values are wirelessly transmitted to the new control device and the control values generated by the device are compared to the control values generated by the existing control device. After the test, the control values generated by the new control device are output to the automation components instead of the control values generated by the existing control device.

4 Claims, 3 Drawing Sheets

(51) Int. Cl.
   *G05B 19/05* (2006.01)
   *G05B 19/418* (2006.01)

(52) U.S. Cl.
   CPC  *G05B19/41845* (2013.01); *G05B 2219/25471* (2013.01); *G05B 2219/31251* (2013.01); *Y02P 90/16* (2015.11); *Y02P 90/18* (2015.11)

(56) References Cited

U.S. PATENT DOCUMENTS

| | | | |
|---|---|---|---|
| 5,682,476 | A | 10/1997 | Tapperson et al. |
| 5,761,518 | A | 6/1998 | Boehling et al. |
| 5,777,874 | A * | 7/1998 | Flood et al. .............. 700/82 |
| 5,933,347 | A * | 8/1999 | Cook et al. .............. 700/82 |
| 5,966,304 | A * | 10/1999 | Cook et al. .............. 700/82 |
| 6,741,554 | B2 * | 5/2004 | D'Amico et al. .......... 370/225 |
| 6,845,301 | B2 * | 1/2005 | Hamamatsu et al. ........ 700/292 |
| 7,623,479 | B2 | 11/2009 | Tapperson et al. |
| 7,818,465 | B2 * | 10/2010 | Chen ............... G05B 19/0428 710/10 |
| 8,260,948 | B2 * | 9/2012 | Chand et al. .............. 709/231 |
| 2004/0255186 | A1 * | 12/2004 | Lau ................... 714/6 |
| 2005/0047330 | A1 | 3/2005 | Tapperson et al. |
| 2007/0055470 | A1 * | 3/2007 | Pietrzyk et al. ............ 702/104 |
| 2007/0168058 | A1 * | 7/2007 | Kephart et al. ............ 700/82 |
| 2008/0183316 | A1 * | 7/2008 | Clayton .................. 700/90 |
| 2008/0250162 | A1 | 10/2008 | Nixon et al. |
| 2009/0097415 | A1 * | 4/2009 | Shepard et al. ............ 370/254 |
| 2009/0102601 | A1 | 4/2009 | Mathiesen et al. |
| 2009/0247082 | A1 * | 10/2009 | Sathath et al. ............ 455/41.2 |
| 2010/0127824 | A1 * | 5/2010 | Moschl et al. ............ 340/5.65 |
| 2016/0026166 | A1 * | 1/2016 | Gamer ................. G05B 9/03 700/81 |

FOREIGN PATENT DOCUMENTS

| | | |
|---|---|---|
| CN | 101271332 A | 9/2008 |
| DE | 112007001130 T5 | 9/2009 |
| EP | 1 840 684 | 10/2007 |
| GB | 2 403 043 | 12/2004 |

* cited by examiner

METHOD AND AUTOMATION SYSTEM FOR REPLACING AN EXISTING CONTROL DEVICE IN AN AUTOMATION SYSTEM WITH A NEW CONTROL DEVICE AND AUTOMATION SYSTEM DESIGNED FOR THIS PURPOSE

CROSS-REFERENCE TO RELATED APPLICATIONS

This is a U.S. national stage of application No. PCT/EP2011/053654 filed 10 Mar. 2011. Priority is claimed on German Application No. 10 2010 010 890.1 filed 10 Mar. 2010, the content of which is incorporated herein by reference in its entirety.

BACKGROUND OF THE INVENTION

1. Field of the Invention

The invention relates to a method for replacing an existing control device in an automation system by a new control device.

The invention moreover relates to an automation system configured to implement the method.

2. Description of the Related Art

In automation systems for technical or industrial plants, e.g., in the process industry, production and manufacturing industry, power industry, building engineering or network technology, physically distributed, non-central automation components, such as field or process devices, perform specified functions in the context of plant automation in the plant concerned, and in the course of this may exchange information that is relevant to the process, plant and/or devices, but always work together with higher-level components of the automation system, i.e., its control or engineering system. The components of the automation system include measuring transducers for pressure, temperature, flow rate, filling level and so forth, analysis devices for the analysis of gas or liquids, weighing systems, positioning actuators, position controllers for valves, other non-central regulators and frequency converters for electric motor drives. In order to exchange the data within the automation system, the automation components in the non-central peripheral region, in some cases in combination with non-central controllers and regulators with operation and observation, are connected together via fieldbuses or other communication paths, whereby different fieldbuses are connected together through bus couplers. The fieldbuses can, in turn, be connected through control devices, such as programmable logic automation devices, to a central plant bus, to which the control or engineering system, i.e., the central control, regulation, operation and observation system, is also connected. The control or engineering system consists of one or more control devices, whereby here the term control device also refers to a partial system within the control or engineering system.

U.S. Pat. No. 7,623,479 discloses an automation system in which the components of the automation system can communicate with the control system both by cables and wirelessly, whereby the wired communication is used for the process automation itself, and the wireless communication is used when there are malfunctions or during servicing of the wired communication system, or for special monitoring and control tasks. For the purposes of the wireless communication, the automation components contain radio transmitters or are connected in groups to radio transmitters. Radio transmitters in the form of adapters that can be detachably fitted to automation components have now also become known.

When an existing automation system is replaced by a new one, the existing automation components often continue to be used, and only the control system or parts of it (control device) are exchanged. The automation components can, however, only be connected to and operated by one system at a time. When exchanging the control device, the automation components are disconnected from the old control device and are connected to the new control device. This rewiring involves significant work, and results in long, expensive down-times. In order to reduce these down-times, new cables can be installed in addition to those that already exist, but there is often insufficient room in the cable ducts. Only after the automation components have been connected to the new control device can it be tested and brought into operation.

SUMMARY OF THE INVENTION

It is therefore an object of the invention to provide a method for replacing an existing control device in an automation system by a new control device, whereby the existing and new control devices are both configured to receive measured values from automation components of the automation system, to process the received measured values and to generate control values for the, or for individual, automation components and/or other automation components.

This and other objects and advantages are achieved in accordance with the invention by providing a method for solving the problem of down-times in that in order to test the new control device during operation of the existing control device, whereby the existing control device receives measured values and outputs control values to the automation components, the measured values and control values are transmitted wirelessly to the new control device, and the control values generated by the new control device are compared with the control values generated by the existing control device, and that after the test the control values generated by the new control device are output to the automation components instead of the control values generated by the former control device. The new control device is thus tested while the automation components continue to be operated together with the old control device. Here, the new control device receives the measured values generated by the automation components over a wireless communication path, which includes device-specific parameters and status information as required. Based on the measured values received and, if relevant, operating inputs provided by operating personnel, the new control device generates control values which are not, however, output to the automation components, but which are compared with the control values generated by the old control device and output to the automation components. Only after the new control device has been successfully tested are the automation components operated together with the new control device, in that the control values generated by the new control device are output to the automation components instead of the control values generated by the former control device.

The method in accordance with the invention can be used regardless of whether the automation components in the automation system normally communicate with the old or new control device via cables and/or wirelessly. At present, however, automation systems with wired, or at least predominantly wired, communication structures (e.g., bus systems, two-wire cables) remain the rule, whereby the method in accordance with the invention has considerable advantages particularly in relation to these automation systems. In such automation systems, in which at least some of the automation components are connected to the existing control device over wired communication paths, after the test on the new control device the wired communication paths are disconnected from the existing control device and connected to the new control device.

The control values from the former control device that are used to test the new control device can be transferred from the former directly, wirelessly, to the new control device.

Preferably, the control values are transmitted from those automation components for which they are intended to the new control device, while the measured values are also transmitted from those automation components that generate them to the new control device. For this purpose, the automation components may contain radio transmitters or may be connected in pairs or larger groups to radio transmitters. In automation systems with wired communication structures, the wireless communication paths are only required for testing the new control device, so that the automation components favorably are fitted with radio adapters for wireless transmission of the measured values and/or control values to the new control device. The radio adapters are detachably mounted on the automation components, and can thus be removed after the new control device has been brought into operation.

An automation system with a control device that is configured to receive measured values from automation components of the automation system and to generate control values for the, or for individual, automation components and/or other automation components is configured in accordance with the invention that the automation components comprise a transmission device for wirelessly transmitting the measured values and the control values received to the control device, and that the control device comprises a comparison device for comparing the control values it has generated with the control values received from the automation components.

For the reasons listed above, the transmission device preferably consist of radio adapters that are detachably mounted on the automation components.

The control device preferably comprises a switching device for switching between the wireless reception of the measured values during the test and wired reception of the measured values after the new control device has been connected to the wired communication structure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For the purposes of further explanation of the invention, reference is made below to the figures in the drawing, in which.

DETAILED DESCRIPTION OF THE PREFERRED EMBODIMENTS

Figure 1:
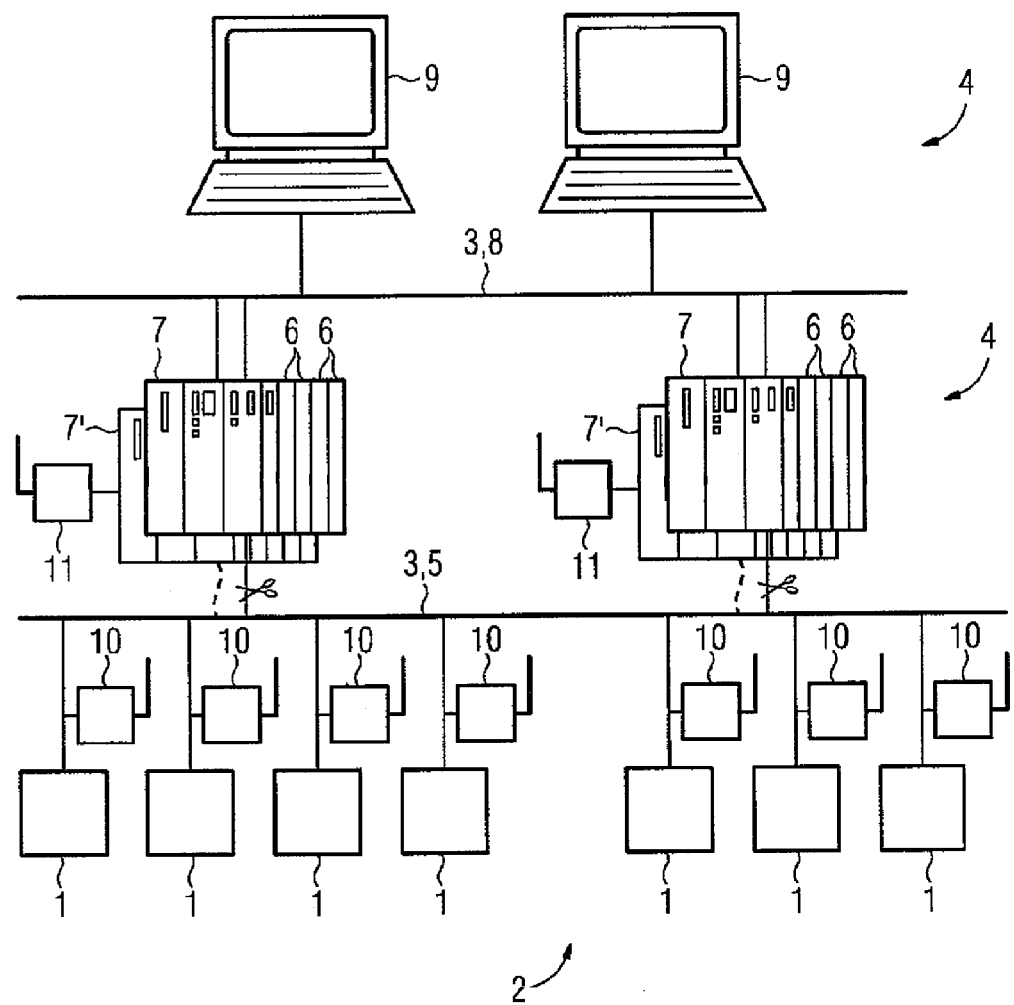
FIG. 1 is a schematic block diagram of an embodiment of an automation system for performing the method in accordance with the invention.

FIG. 1 shows a simplified schematic representation of an example of an automation system with a plurality of automation components (field devices) 1 that, in a process that is to be controlled and/or regulated, i.e., on the field level 2, perform specified measurement, control and regulation functions, i.e., acquire measured magnitudes from the process and have an effect on the process through control actuations. The field devices 1 may comprise sensors, actuators, measuring transducers, analysis devices, drives and so forth. The field devices 1 exchange process, function and/or device-relevant data between themselves and with a control and engineering system 4, over a usually wired communication system 3, for which purpose the field devices 1 are connected over a fieldbus 5, e.g., according to the PROFIBUS standard, to input and output modules 6 of automation devices 7, e.g., programmable logic controllers (PLC), which in turn are connected over a central plant bus 8 with higher-level computer systems 9.

It will be assumed below that the control device comprising the automation devices 7 is to be replaced by a new control device 7'. For this purpose, the automation components (field devices) 1 are fitted with radio adapters 10 which transmit measured values generated by the field devices 1 and control values generated by the existing control device 7 for the field devices 1 wirelessly to the new control device 7'. The new control device 7', which is connected for this purpose with corresponding radio receivers 11 and is not yet connected to the fieldbus 5, generates, in accordance with the measured values received and possibly, for example, with operator inputs to the computer systems 9, control values which are, however, not output to the automation components 1, but which are compared with the control values generated by the old control device 7 that are supplied to the automation components 1. Only when the new control device 7' has been successfully tested are the automation components operated together with the new control device 7', in that the old control device 7 is disconnected from the communication system 3, and the new control device 7' is connected to the fieldbus 5.

Figure 2:
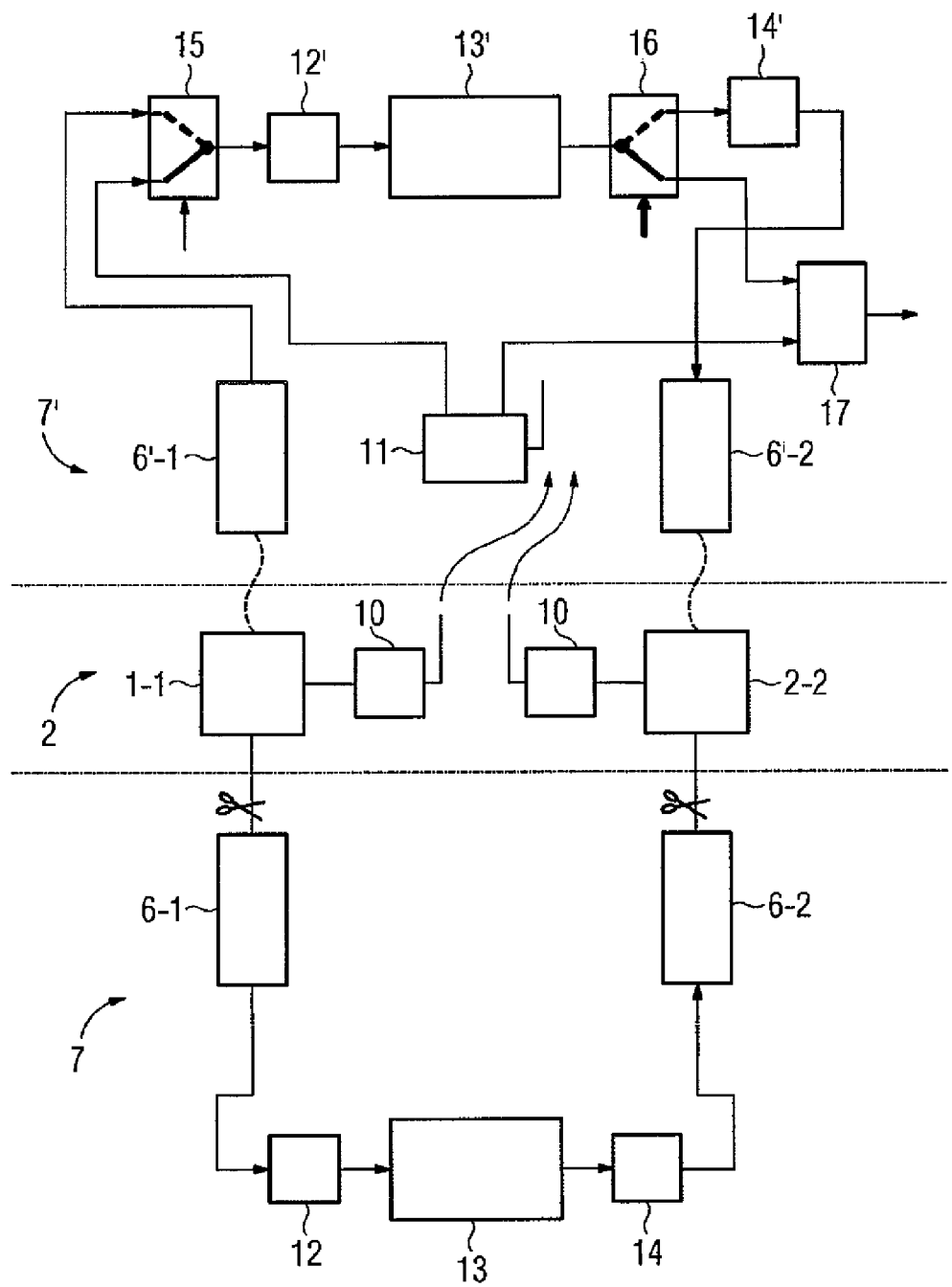
FIG. 2 is a block diagram with two automation components comprising a sensor and an actuator that are to be disconnected from an old automation device and connected to a new one.

FIG. 2 shows a schematic block diagram of two automation components 1, of which the one on the left represents a sensor 1-1, and the one on the right an actuator 2-2, and an old and a new automation device 7 and 7' respectively, which represent respectively the old and new control devices. The sensor 1-1 is connected to an input module 6-1, and the actuator 2-2 is connected to an output module 6-2 of the old automation device 7. The measured values supplied by the sensor 1-1 are passed via an input driver 12 to a regulation algorithm 13 which, possibly in accordance with further measured values, calculates control values that are passed via an output driver 14 to the actuator 2-2.

The new automation device 7' accordingly comprises an input module 6'-1, an input driver 12', a regulation algorithm 13', an output driver 14' and an output module 6'-2. The sensor 1-1 and the actuator 2-2 are initially not connected to the input driver 12' or the output driver 14'.

In order to test the new automation device 7', the measured values generated by the sensor 1-1 and the control values supplied to the actuator 2-2 are transmitted wirelessly to the new automation device 7'. The radio receiver 11 there is constructed as a gateway that supplies the received measured values to the input driver 12'. For this purpose, a changeover unit 15 is provided between the input module 6'-1 and the input driver 12', and supplies either the measured values coming from the input module 6'-1 or the radio receiver 11 to the input driver 12', depending on the switch position. The following regulation algorithm 13' generates control values that are supplied through a further changeover unit 16 either to the output module 6'-2 or to a comparison unit 17, which also receives the control values from the old automation device 7 that are received by the radio receiver 11. The measured values received and control values generated during operation of the sensor 1-1 and actuator 2-2 together with the old automation device 7 are transmitted wirelessly to the new automation device 7', whereby the control values generated by the new automation device 7' based on the transmitted measured values are compared with the control values generated by the old automation device 7. After testing, the sensor 1-1 and actuator 1-2 are disconnected from the old automation device 7 and connected to the input and output modules 6'-1 and 6'-2 respectively of the new automation device 7'.

Figure 3:
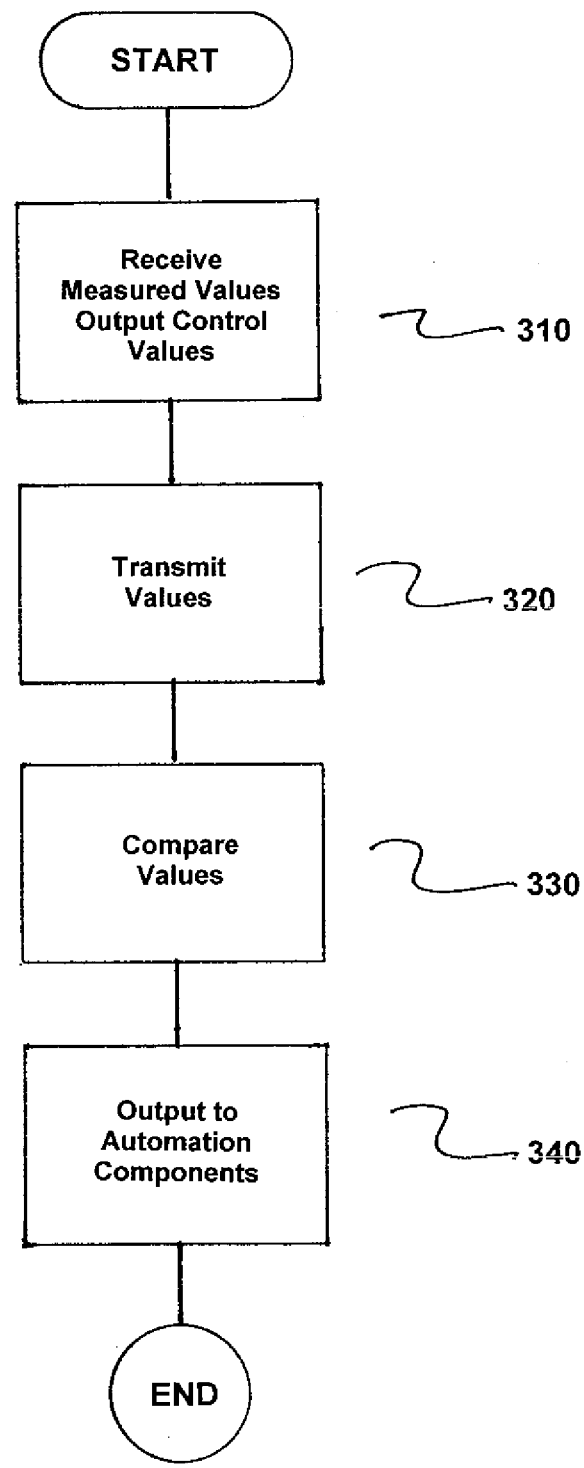
FIG. 3 is a flowchart of the method in accordance with an embodiment of the invention.

FIG. 3 is a flowchart of a method for replacing an existing control device in an automation system by a new control device, where the existing and new control devices are configured to receive measured values from automation components of the automation system, process the received measured values and generate control values for either at least one automation component of the automation components or other automation components of the automation system. The method comprises receiving, by the existing control device, measured values and outputting control values from the existing control device to the automation components to test the new control device during operation of the existing control device, as indicated in step 310.

The measured values and control values are then transmitted wirelessly to the new control device, as indicated in step 320. Control values generated by the new control device are compared with the control values generated by the existing control device, as indicated in step 330. The control values generated by the new control device are then output to the automation components after the test instead of the control values generated by the existing control device, as indicated in step 340.

While there have shown and described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for replacing an existing control device in an automation system by a new control device, the method comprising the steps of:
    receiving, by the existing control device, measured values from automation components, processing the received measured values, generating control values for at least one of said automation components and other automation components and outputting control values from the existing control device to the at least one automation component, at least some of the automation components being connected to the existing control device over wired communication paths;
    testing the new control device by (i) transmitting the measured values to be received by the existing control device and the control values generated by and output from the existing control device upon receipt of the received measured value wirelessly to the new control device based on a switch position of a changeover unit, (ii) generating, by a regulation algorithm of the new control device, control values and supplying the generated control values through a further changeover unit to a comparison unit and (iii) comparing, via the comparison unit, control values upon receipt of the transmitted measured values generated by the new control device with the control values generated by and output from the existing control device;
    outputting, after successfully testing the new control device, the control values generated by the new control device to the automation components instead of the control values generated by the existing control device; and
    disconnecting the wired communication paths from the existing control device after the testing and connecting the wired communication paths to the new control device.

2. The method as claimed in claim 1, wherein the automation components include radio adapters for wireless transmission of at least one of the measured values and control values to the new control device.

3. An automation system with an existing control to be replaced by a new control device, the automation system comprising,
    the existing and new control devices being configured to receive measured values from automation components of the automation system, process the received measured values and generate control values for said automation components and other automation components of the automation system;
    wherein the automation components each comprise a transmission device for wirelessly transmitting the measured values and control values received from the existing control device to the new control device;
    wherein the new control device comprises a changeover unit for supplying measured values based on a switch position, and a regulation algorithm for generating the control values and supplying the generated control values through a further changeover unit to a comparison unit for comparing control values generated by the new control device upon receipt of the transmitted measured values with the received control values from the automation components; and
    the new control device further outputting the control values generated by the new control device to the automation components instead of the control values generated by the existing control device when desired comparison results are generated.

4. The automation system as claimed in claim 3, wherein the transmission device consist of radio adapters detachably mounted on the automation components.

* * * * *